United States Patent [19]
Chivaluri

[11] Patent Number: 5,872,931
[45] Date of Patent: Feb. 16, 1999

[54] MANAGEMENT AGENT AUTOMATICALLY EXECUTES CORRECTIVE SCRIPTS IN ACCORDANCE WITH OCCURRENCES OF SPECIFIED EVENTS REGARDLESS OF CONDITIONS OF MANAGEMENT INTERFACE AND MANAGEMENT ENGINE

[75] Inventor: Dinkar Chivaluri, Woburn, Mass.

[73] Assignee: Veritas Software, Corp., Mountain View, Calif.

[21] Appl. No.: 696,267

[22] Filed: Aug. 13, 1996

[51] Int. Cl.⁶ .................................................. G06F 13/00
[52] U.S. Cl. ............................ 395/200.53; 395/200.54; 395/200.32
[58] Field of Search ..................... 395/200.54, 200.53, 395/200.5, 185.08, 185.02, 200.32; 340/506; 702/186

[56] References Cited

U.S. PATENT DOCUMENTS

| | | | |
|---|---|---|---|
| 5,204,955 | 4/1993 | Kagei et al. | 395/185.08 |
| 5,621,663 | 4/1997 | Skagerling | 702/186 |
| 5,621,892 | 4/1997 | Cook | 395/200.54 |
| 5,655,081 | 8/1997 | Bonnell et al. | 395/200.32 |
| 5,666,481 | 9/1997 | Lewis | 395/182.02 |
| 5,696,486 | 12/1997 | Poliquin et al. | 340/506 |
| 5,729,472 | 3/1998 | Seiffert et al. | 395/200.54 |
| 5,758,071 | 5/1998 | Burgess et al. | 395/200.5 |
| 5,758,083 | 5/1998 | Singh et al. | 395/200.53 |
| 5,761,428 | 6/1998 | Sidey | 395/200.53 |
| 5,768,506 | 6/1998 | Randell | 395/200.32 |
| 5,768,508 | 6/1998 | Eikeland | 395/200.32 |
| 5,774,660 | 6/1998 | Brendel et al. | 395/200.31 |
| 5,778,183 | 7/1998 | Filion et al. | 395/200.53 |

OTHER PUBLICATIONS

OpenVision, *OpenV\* Event Manager*, OpenVision Technologies, 1995.

Sun Microsystems Computer Company, *Solstice™ SyMON™ System Monitor Executive Overview*, 1996.

*Primary Examiner*—Le Hien Luu
*Attorney, Agent, or Firm*—Carr & Ferrell, LLP

[57] ABSTRACT

A management system for event management in a computer network includes management interfaces residing on an administrative computers, management engines residing on server computers, and management agents residing on managed computers within the network. The management agent uses alarms corresponding to predefined events to notify the management interface via the management engine if the predefined events occur, thereby allowing the system administrator to administer the managed computer network. The management agents may also include corrective scripts which are automatically executed in response to the predefined event and a connection aging module which releases inactive connections between the management agent and the management engine.

20 Claims, 7 Drawing Sheets

MANAGEMENT AGENT AUTOMATICALLY EXECUTES CORRECTIVE SCRIPTS IN ACCORDANCE WITH OCCURRENCES OF SPECIFIED EVENTS REGARDLESS OF CONDITIONS OF MANAGEMENT INTERFACE AND MANAGEMENT ENGINE

BACKGROUND OF THE INVENTION

1. Field of the Invention

This invention relates generally to systems for managing networks of computers and more particularly to systems for monitoring events occurring in a plurality of computers within a computer network.

2. Description of the Background Art

The management of computer networks presents an increasing challenge as the size of these networks grows larger. Computer networks may have a variety of different computers, databases and applications dispersed over a large geographical area and each network component may have different ways of handling information. Ideally these computers are controlled through a relatively small number of "administrative computers" which are dedicated to management and administrative functions, each managing and administrating a large number of the heterogeneous "managed computers."

Management functions include setting and monitoring of various alarms that indicate conditions or "events" requiring management action, the definition and implementation of these actions when the specified events occur, and the monitoring of statistics concerning the operation of the various network computers. This management process can become very complex and time-consuming in large computer networks. Furthermore, the corrective actions for different types of managed computers may vary widely in a highly diverse distributed computing environment. Any given management or administration system used in conjunction with large computer networks is limited by the above factors.

In addition, some aspects of the network communication between computers may impose limitations on the number of computers that can be managed by a given administrative computer. For example, some versions of the UNIX operating system limit the number of computers with which an administration program can simultaneously be connected by limiting the number of data structures in memory that the administration program can use to describe individual network connections. Since computer networks may gradually increase in size, this may become a significant problem in conventional management and administration systems.

Thus it is desirable to provide a management system that is sufficiently flexible to handle the administration of a wide variety and a large number of managed computers in an efficient manner. Such a management system preferably achieves two distinct objectives. First, as the number of managed computers increases, it becomes essential to prevent the systems administrator from becoming overwhelmed with the increasing amount of management information and action required, and to automate these operations as much as possible. Thus it is desirable to include facilities within a management system to avoid presenting the system administrator with excessive amounts of information and to minimize the number of decisions and actions that are required by the system administrator. Secondly, it is desirable to provide a management system that is not limited by aspects of network communications within a given operating system, so that the management system can be scaled to handle increasingly large numbers of computers. Therefore, an improved scalable event management system is needed for administering a distributed computing environment according to the present invention.

SUMMARY OF THE INVENTION

The present invention provides a hierarchically structured management system that monitors defined events and administers prescribed actions in a large number of managed computers. The distributed computing environment may be quite large and the management activity may be monitored at the uppermost tier of the hierarchy from a plurality of management interfaces. A management interface is a program executing on a computer (referred to as an "administrative" computer) with which a system administrator interacts to monitor and direct management operations across managed computers. The management interface administers a plurality of managed computers by interacting with the middle tier of the hierarchy which consists of one or more centrally-located management engines. A management engine is another program executing on a computer (typically a server-class computer) which redirects management requests and operations across many managed computers. The management engine directly communicates with a set of management agents. The management agent is a program running on the managed computer and actually executes the management requests and operations on behalf of the systems administrator. Each management agent includes alarms and information that defines alarm criteria and enables corrective action to be taken. Examples of such alarms include log file error alarms, process alarms indicating the occurrence of defined processes, disk alarms that relate to the amount of available space on a disk, hardware failure alarms, performance alarms relating to statistics of computer operating systems and user-defined alarms. Certain of these alarms generally request or provide an opportunity for corrective action.

In the present management system, the corrective action required by a given alarm can be carried out in many cases locally by the management agent, in contrast to previous management systems. That is, the present management system provides "intelligent" management agents that can be configured to automatically carry out certain actions in response to given alarms, without the necessity of notifying any management interface or system administrator. This "lights out" mode of operation is implemented by a specified set of routines, configured in the management agent, that are invoked by alarm conditions. These routines can be scripts prescribed by the system administrator. The administrator's attention is thus not required by each and every alarm condition and these corrective procedures can be carried out even when a management interface or management engine is inoperable or inaccessible.

The corrective script routines normally are programs that run on the local managed computer (e.g., "local shell execution"). Alternatively, the corrective scripts can be run by management agents as remote shell execution on a management engine or management interface itself. In addition, the management system provides for filtering of alarm messages from various managed computers to avoid redundancy and false alarms. When the management agent on a given computer generates an alarm, previous alarms are compared to the generated alarm and messages are sent to the management engine or interface only at prescribed intervals. That is, if the management agent continuously detects an alarm condition on a managed computer, the messages are filtered so that the alarm messages sent to the administrator are spaced out over a prescribed period. In other words, the administrator is not flooded with a long sequence of identical alarm messages.

Finally, the present management system provides a scaling capability to overcome the limitations on the number of simultaneous network connections available to a given administrative program. A management interface communicates with one or more management engines and these engines in turn handle the direct communications with a plurality of management agents. Each management engine is capable of communicating with a plurality of management interfaces. The management engines perform many of the routine tasks and are designed to transfer to the management interface only those messages that essentially require administrative attention.

The scalability feature of the present invention includes several mechanisms which overcome limitations on the number of simultaneous network connections which a single management engine can have with a plurality of managed computers. Two of these features are called "connection aging" and the "alternative priority interrupt." Connection aging is performed by connection aging modules associated with individual management agents. The management agents responsively drop their network connection to a given management engine whenever no event activity has occurred within the management agent for a predetermined time-out period. This process effectively frees one of the limited number of network connections which the management engine is capable of simultaneously maintaining.

The term "alternative priority interrupt" refers to a mechanism which assists a management agent to re-establish a previously "aged" (dropped) network connection to a management engine when there are new events to be reported to a management interface. Typical requests for reconnection go directly from the management agent to the management engine. The management engine services the reconnection requests using a normal connection program. However, if that management engine has currently exhausted its limit of open file descriptors, it will not be able to establish another connection with this management agent and the connection attempt by the management agent will eventually fail. If the event which the management agent needs to report is critical, then the management agent will make a second attempt using a "priority interrupt" request to connect to the management engine but will attempt to do so through an alternative priority connection program (within the management engine) which exists only to service such high-priority connection requests. This mechanism effectively insures that if a management agent has urgent information to report to a management engine, the management agent can re-establish a connection regardless of the number of other network connections that the management engine is currently maintaining. The present invention thus utilizes a scalable architecture to effectively manage defined events within a distributed computing environment.

DETAILED DESCRIPTION OF THE PREFERRED EMBODIMENTS

The present invention comprises a scalable event management system for a distributed computing environment which includes management interfaces residing on an administrative computers, management engines residing on server computers and management agents residing on managed computers within the network. The management agent uses alarms corresponding to predefined events to notify the management interface via the management engine if the predefined events occur, thereby allowing the system administrator to administer the managed computers. The management agents may also include corrective scripts which are automatically executed in response to the predefined events, as well as a connection aging module which releases inactive connections between the management agent and the management engine.

Figure 1:
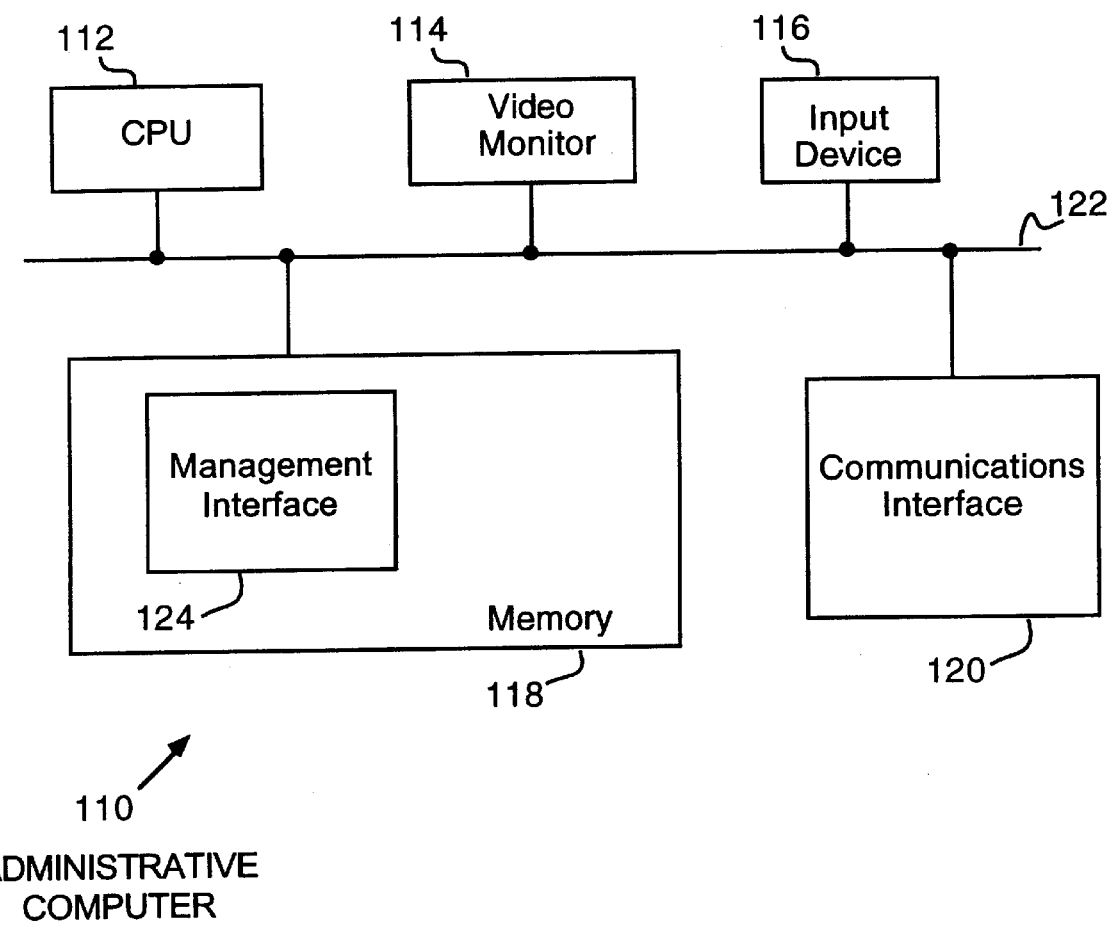
FIG. 1 is a block diagram of an administrative computer including a management interface according to the present invention.

Referring now to FIG. 1, a block diagram of an administrative computer 110 is shown. Administrative computer 110 preferably comprises a central processing unit (CPU) 112, a video monitor 114, an input device 116, a memory 118 and a communications interface 120. In the preferred embodiment, memory 118 contains a management interface 124 which is a program that a systems administrator may use to administer and manage a distributed computing environment. The management interface 124 is further discussed below in conjunction with FIGS. 4, 6 and 7.

Each element of administrative computer 110 preferably has an input and an output coupled to a common system bus 122. Memory 118 may alternatively comprise various storage-device configurations, including Random-Access-Memory (RAM), Read-Only-Memory (ROM), and non-volatile storage devices such as floppy-disks and hard disk-drives. Communication interface 120 is a conventional device which enables administrative computer 110 to communicate with a selected computer network.

Figure 2:
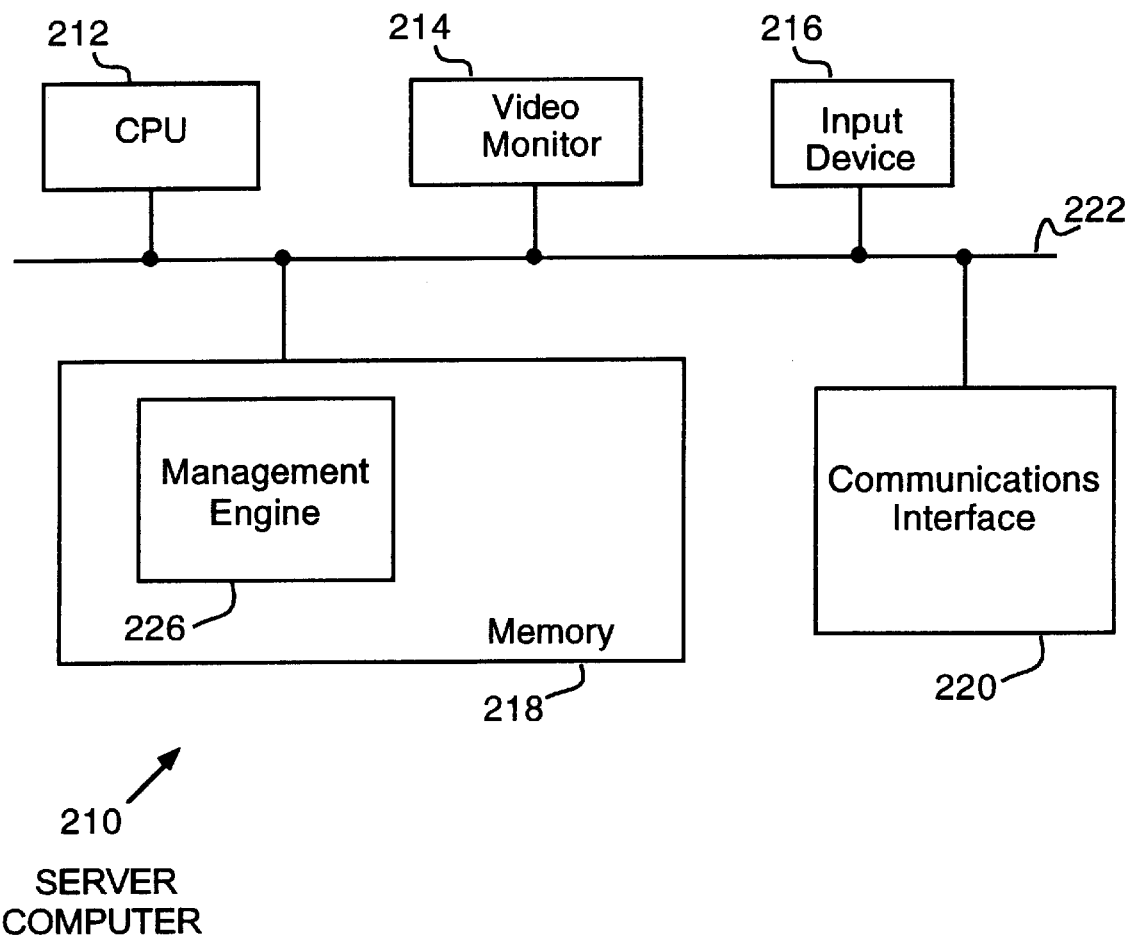
FIG. 2 is a block diagram of a server computer including a management engine according to the present invention.

Referring now to FIG. 2, a block diagram of an server computer 210 is shown. Server computer 210 preferably comprises a central processing unit (CPU) 212, a video monitor 214, an input device 216, a memory 218 and a communications interface 220. In the preferred embodiment, memory 218 contains a management engine 226 which is a program that typically runs on a server-class computer and handles communications between selected components within the distributed computing environment. In other embodiments, management engine 226 may alternately reside within memory 118 of administrative computer 110 (FIG. 1). Management engine 226 is further discussed below in conjunction with FIGS. 4, 6 and 7.

Each element of server computer 210 preferably has an input and an output coupled to a common system bus 222. Memory 218 may alternatively comprise various storage-device configurations, including Random-Access-Memory (RAM), Read-Only-Memory (ROM), and non-volatile storage devices such as floppy-disks and hard disk-drives. Communication interface 220 is a conventional device which enables administrative computer 210 to communicate with a selected computer network.

Figure 3:
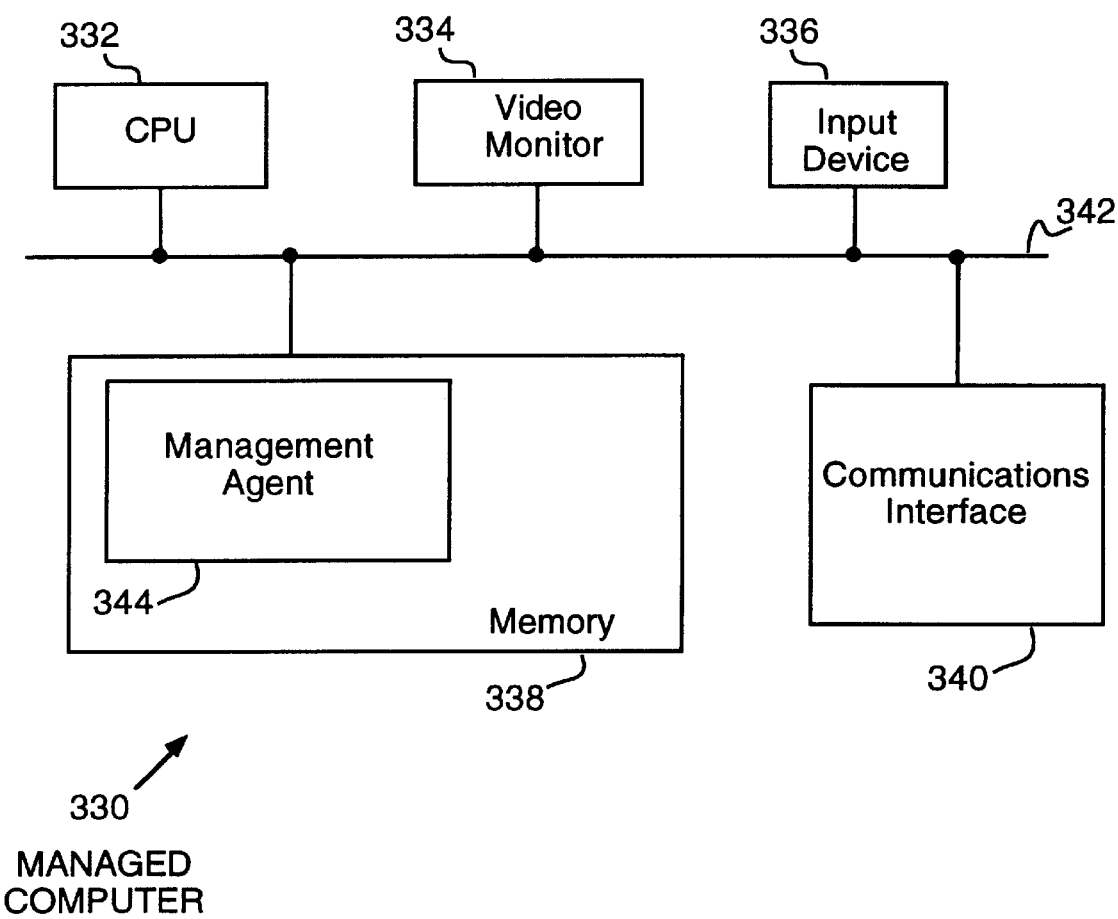
FIG. 3 is a block diagram of a managed computer including a management agent according to the present invention.

Referring now to FIG. 3, a block diagram of a managed computer 330 is shown. Managed computer 330 preferably comprises a central processing unit (CPU) 332, a video monitor 334, an input device 336, a memory 338 and a communications interface 342. In the preferred embodiment, memory 338 contains a management agent 344 which is a program that communicates with management engine 226 and thus indirectly interacts with a management interface 124 within the distributed computing environment. The management agent 344 is further discussed below in conjunction with FIGS. 4–7.

Each element of managed computer 330 preferably has an input and an output coupled to a common system bus 342. Memory 338 may alternatively comprise various storage-device configurations, including Random-Access-Memory (RAM), Read-Only-Memory (ROM), and non-volatile storage devices such as floppy-disks and hard disk-drives. Communication interface 340 is a conventional device which enables managed computer 330 to communicate with a selected computer network.

Figure 4:
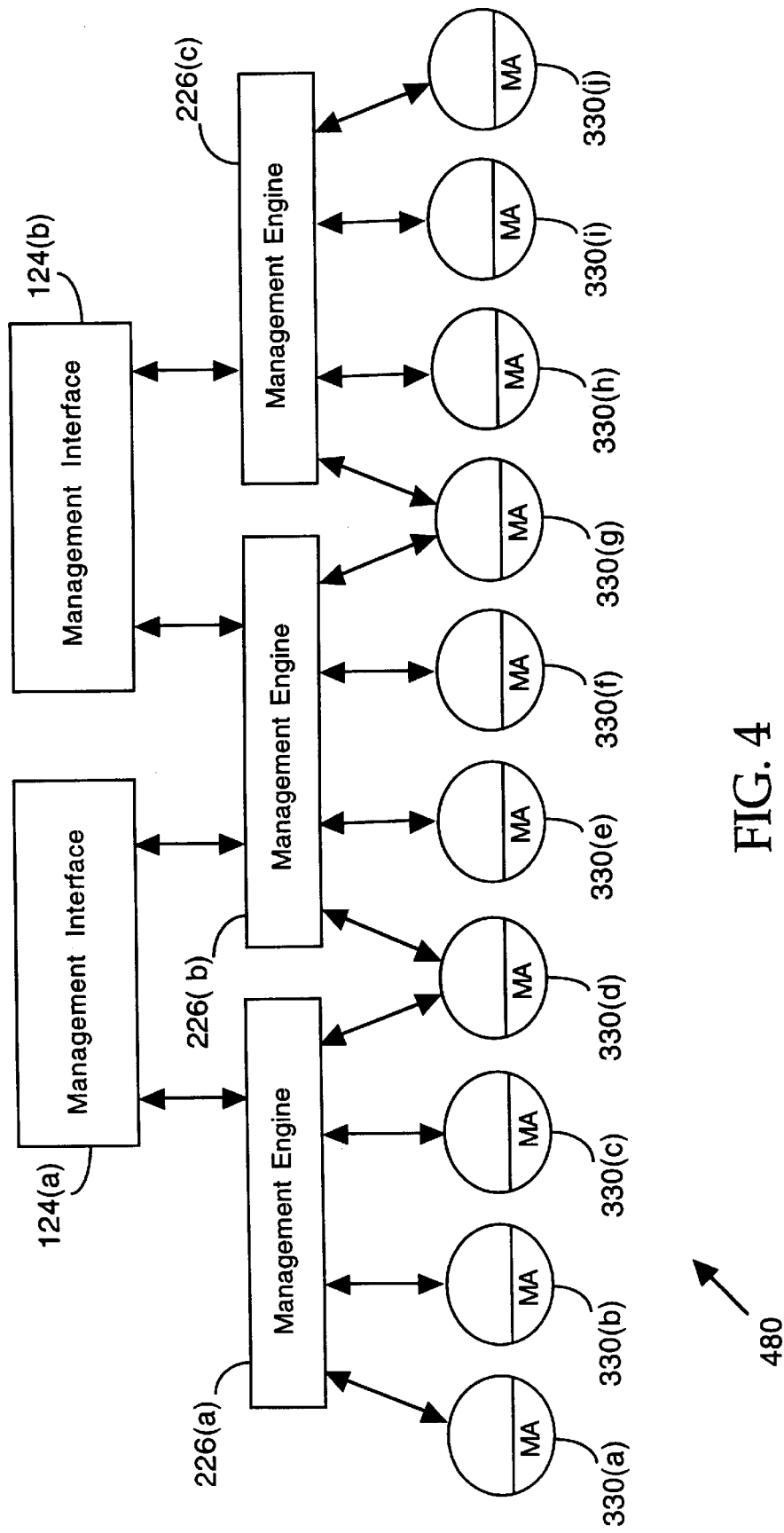
FIG. 4 is a block diagram showing the architecture of an exemplary event management system according to the present invention.

Referring now to FIG. 4, a block diagram of an exemplary event management system is shown. FIG. 4 depicts a small computer network 480 having ten managed computers 330(a through j) each executing a respective management agent 344. Network 480 also includes three management engines 226(a, b and c) which potentially, though not necessarily, execute on their own dedicated server computers 210. Finally, network 480 includes two management interfaces 124(a and b) which potentially, though not necessarily, execute on the systems administrators' dedicated administrative computers 110. In alternate embodiments of the present invention, computer network 480 may readily comprise various configurations other than that shown in FIG. 4. The FIG. 4 configuration of computer network 480 is thus presented for purposes of illustration.

In this simplified example, two management interfaces 124(a) and 124(b) thus administer ten managed computers 330(a through j). Management interface 124(a) communicates with two management engines 226(a) and 226(b). Management engine 226(a) communicates directly with individual management agents 344 on managed computers 330(a through d), while management engine 226(b) communicates with respective management agents 344 on managed computers 330(d through g). Management interface 124(b) communicates with the management engine 226(c) and this management engine 226(c) in turn handles communications with the management agents 344 on managed computers 330(g through j). As shown in the drawing, management interface 124(b) also interacts with the management engine 226(b). In other words, each managed computer 330 may be supervised by a plurality of management engines 226 and subsequently by a plurality of management interfaces 124. For example, managed computers 330(d) and 330(g) are each supervised by two different management engines 226 as illustrated in FIG. 4.

Figure 5:
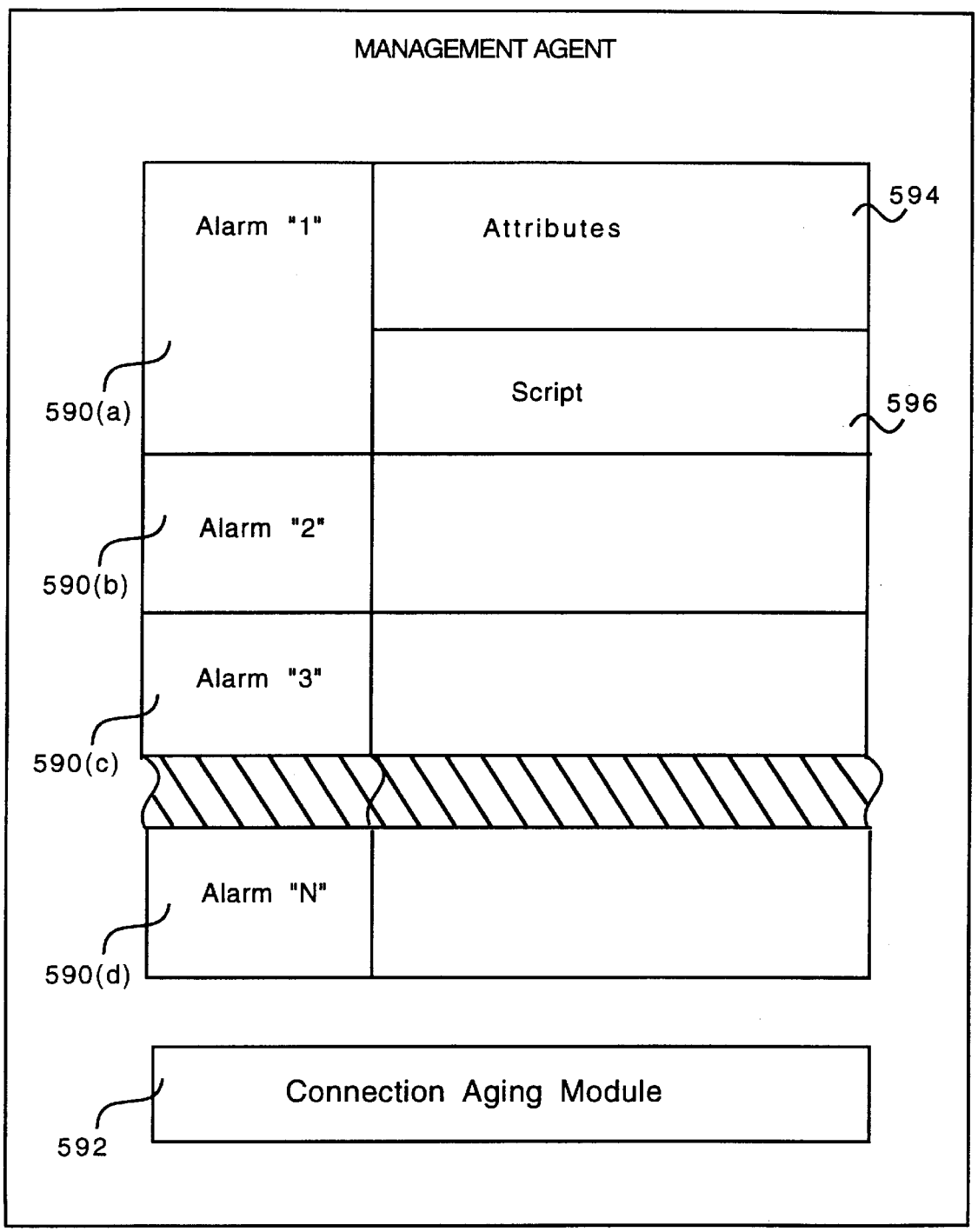
FIG. 5 is a block diagram showing the preferred embodiment of the management agent of FIG. 3.

Referring now to FIG. 5, a block diagram of the preferred embodiment for management agent 344 is shown. In the preferred embodiment, management agent 344 includes data describing a series of events and also incorporates a connection-aging processing module 592. The number of possible alarms 590 is variable depending upon the number of defined events in managed computer 330. FIG. 5 includes alarm 1 (590(a)) through alarm "N" (590(d)) for purposes of illustration. Individual alarms 590 are selectively triggered whenever management agent 344 detects the occurrence of a corresponding predefined event within managed computer 330. Each of these alarms 590 is a persistent object with defined attributes 594, which may include severity (importance or urgency), threshold (defining when the alarm is triggered), collector (instructions for testing for the alarm), and notification (entities notified of the alarm).

Each alarm 590 may also include a corresponding script 596 which is a responsive or corrective process initiated by the alarm 590 in response to the occurrence of a predefined event. Each event definition may be applied to multiple managed computers 330. Once an alarm 590 is triggered it persists until it is reset. Each set of attributes 594 and each script 596 may be specified by the system administrator.

The management system of the present invention includes a variety of alarms 590. Examples include text string or message log alarms, which are triggered by detection of designated text strings such as error messages or date/time messages. Process alarms are set off by the occurrence or absence of designated processes. Query alarms run at time intervals set by the system administrator and interrogate the system to return Boolean values (i.e. "yes/no" or "true/false"). Disk space alarms check for available space on a disk and are triggered when this space is less than a threshold value. Hardware alarms detect hardware faults. Performance alarms can be defined to monitor certain statistics of the operating system, such as the number of system calls of a certain type, and may be triggered by current values or by running averages. Finally, the present invention also encompasses user-defined alarms.

In addition, the management agent 344 may include a set of default corrective scripts 596, which may be defined by the user, that are automatically carried out in response to certain defined alarms 590 without first notifying the system administrator. This mode of operation (termed "lights out") enables the management agent 344 on a given managed computer 330 to take corrective action automatically for those type of alarms 590 which do not require intervention by the system administrator. For example, in the case of a hardware failure alarm for a peripheral device, the management agent 344 may disable the device immediately without prior notification to the system administrator. Alternatively, an alarm 590 may be defined to require user-authorization before running a corrective shell script 596. Thus, in comparison with previous systems, the present management system has the advantage that the administrator's attention and response are not necessarily required for the appropriate corrective action. The present invention has the further advantage that alarms 590 and corrective scripts 596 may continue to function when management interface 124 or management engine 226 becomes inoperable or inaccessible.

Finally, the alarms 590 are preferably filtered to avoid redundancy and false alarms. This "intelligent" alarm filtering reduces the number of instances in which an alarm 590 is triggered in an environment that has not changed from the previous instance in which the same alarm 590 was triggered. The manner in which this intelligent filtering is carried out depends on the type of alarm 590. Intelligent filtering does not apply to user defined alarms 590, which are triggered according to the conditions defined by the user.

In the case of performance alarms, triggering occurs when the current value or the running average value of some quantity crosses a defined threshold. For example, if the alarm is intended to be triggered when the quantity exceeds a threshold value, then an intelligent filter alarm definition will ensure that when the alarm is triggered once and it will not go off again until the alarm quantity falls below the threshold and then exceeds the threshold again. This technique for intelligent filtering is also implemented for process alarms and space alarms.

For message log alarms, a sampling frequency is defined, and within each sampling interval the alarm is triggered by the first occurrence of the alarm message, and is retriggered by no succeeding occurrences of that message within the same interval. Query alarms are triggered by Boolean values of some variable, namely "true-false" or "yes-no". If an intelligently filtered query alarm is triggered by the value "true" of a variable, then it will not be triggered again until this variable takes the value "false" and then returns to the value "true". Intelligent filtering of printer alarms are similar in concept. If a printer alarm is triggered by a spool queue job, then it will not be triggered again until a different spool queue job commences and the alarm condition is again satisfied.

To summarize, when the management agent 344 on a given managed computer 330 generates an intelligently filtered alarm 590, an action script 596 may be specified to provide comparison of previous alarms with the generated alarm. This comparison allows the user to prescribe intervals between transmission of alarm messages to the management engine 226 and on to the management interface 124. Thus, if the management agent 344 continuously detects an alarm 590 on a managed computer 330, the alarms 590 are filtered so that the notifications sent to the administrator are spaced out over a prescribed period. The system administrator is thereby notified of an alarm condition, and periodically receives reminders that the condition continues to exist, until corrective action takes place and the alarm 590 is reset. The parameters of this entire process are defined by the user.

The scalability feature of the present invention resides in the several mechanisms which overcome limitations on the number of simultaneous network connections which a single management engine 226 can have with a plurality of managed computers 330. Two of these features are called "connection aging" and the "alternative priority interrupt".

"Connection aging" is performed by connection aging modules 592 associated with individual management agents 344. The management agents 344 responsively drop their network connection to a given management engine 226 whenever no event activity has occurred within management agent 344 for a predetermined time-out period. This process effectively frees one of the limited number of network connections which management engine 226 is capable of simultaneously maintaining. Simultaneous network connections are limited because each of the network connections maintained by a management engine 226 requires a data structure in memory. This data structure is traditionally referred to as an "open file descriptor" on UNIX operating systems. Most UNIX operating systems provide for only 256 open file descriptors per actively executing program (also called a "process"). This implies that a given management engine 226 can only simultaneously supervise up to 256 management agents 344 if the network connections are required to remain in place continuously. By allowing the connection aging modules 592 to "age" their network connections to a management engine 226 and by dropping the connection when it is not actively in use, the limitation on the management engine 226 is alleviated. Because the management agents 344 do not need to stay continuously connected to the management engine 226, a management engine 226 can then simultaneously deal with a much larger number of managed computers 330.

Figure 6:
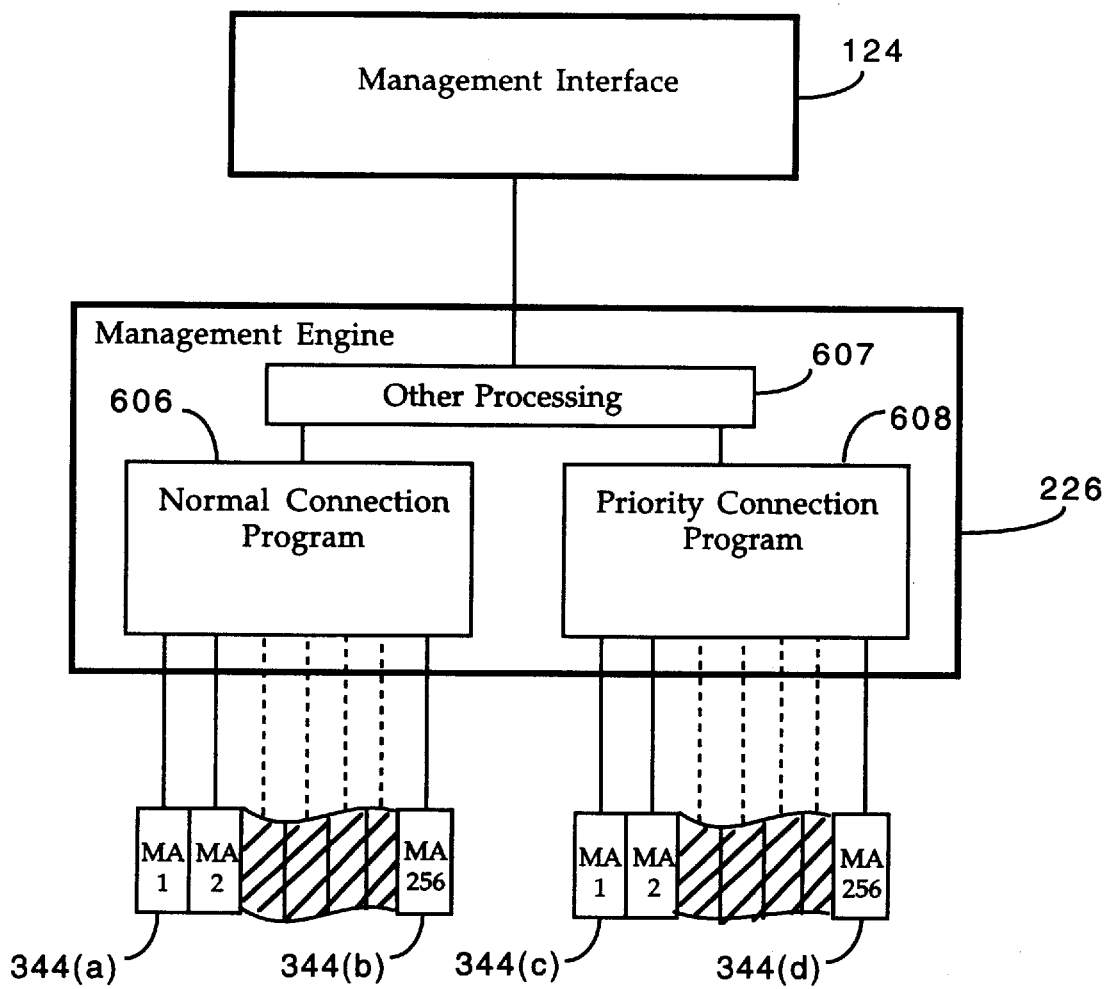
FIG. 6 is a block diagram showing the preferred embodiment of the alternative priority interrupt mechanism according to the present invention.

Referring now to FIG. 6, a block diagram of the preferred embodiment for the alternative priority interrupt mechanism is shown. In the preferred embodiment, management engine 226 includes a normal connection program 606 and also a priority connection program 608.

In the present invention, the term "alternative priority interrupt" refers to the mechanism which assists management agent 344 to re-establish a previously "aged" (dropped) network connection to a management engine 226 when there are new events to be reported to management interface 124. Typical requests for reconnection pass directly from management agent 1 (344(a)) through management agent 256 (344(b)) executing on managed computers 330 and the requests are received by management engine 226 executing on server computer 210. Management engine 226 then services the reconnection requests using the normal connection program 606.

However, if that management engine 226 has currently exhausted its limit of 256 open file descriptors, it will not be able to establish another connection with the management agent 334 and the connection attempt (via normal connection program 606) will eventually fail. If the event which management agent 344 seeks to report is critical, then management agent 344 will make a second attempt using a "priority interrupt" request to connect to management engine 226. Management agent 344, however, will attempt to reconnect through an alternative priority connection program 608 which exists only to service such high-priority connection requests. As shown in FIG. 6, management agent 1 (344(c)) through management agent 256 (344(d)) are unable to reconnect through normal connection program 606 and may thus reconnect through priority connection program 608.

This mechanism effectively insures that if a management agent 344 has urgent information to report to a management engine 226, the management agent 344 can re-establish a connection with a management engine 226 regardless of the number of other network connections that management engine 226 is currently maintaining.

Figure 7:
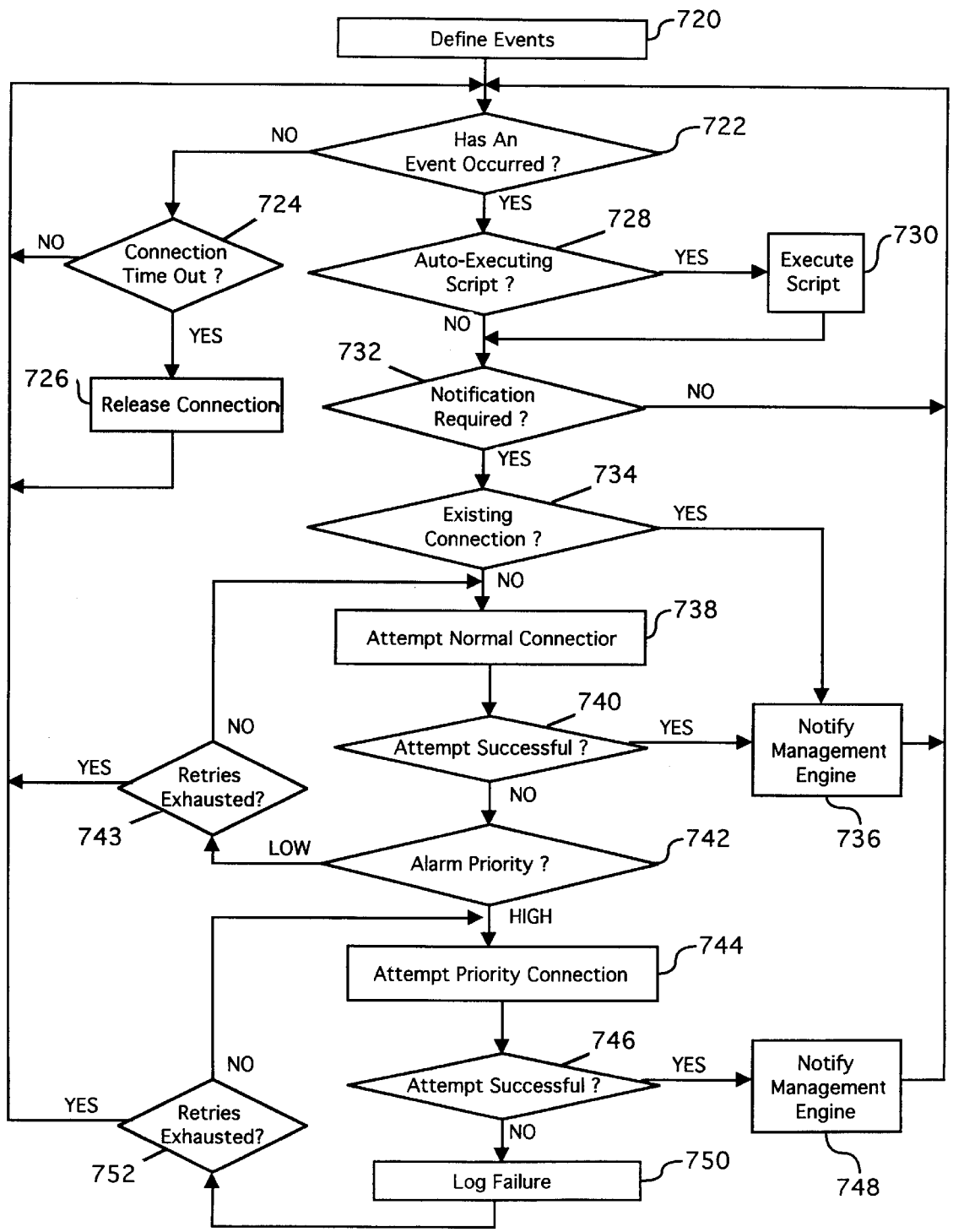
FIG. 7 is a flowchart of preferred method steps for managing an event according to the present invention.

Referring now to FIG. 7, a flowchart of preferred method steps for managing an event is shown, according to the present invention. Initially, a system administrator defines 720 one or more events and then checks 722 managed computer 330 to determine if any of the defined events has occurred.

If an event has not occurred, then management agent 344 checks 724 connection aging module 592 to determine whether a connection time-out has occurred. Connection aging module 592 monitors the occurrence of defined events within management agent 344 and thereby measures the time period that the connections between management agent 344 and management engine 226 remains inactive.

If a connection's inactive period exceeds a predetermined length of time, connection aging module 592 generates a connection time-out and management agent 344 releases 726 the connection to management engine 226 and then returns to step 722 to check whether a defined event has occurred. In step 724, if connection aging module 592 has not generated a connection time-out, then the FIG. 7 process returns to step 722 and management agent 344 checks again to determine whether a defined event has occurred.

In step 722, if a defined event has occurred, then management agent 344 determines 728 whether there is a corresponding auto-executing script 596. If an auto-executing script 596 exists, then management engine 344 executes 730 the script 596 and the FIG. 7 process advances to step 732. However, if no auto-executing script 596 exists, then management agent 344 determines 732 whether notification of the occurrence of the defined event is required.

If notification is not required, the FIG. 7 process returns to step 722. However, if notification is required, then management agent 344 determines 734 whether an active connection to management engine 226 already exists. If a connection already exists, management agent 344 notifies 736 management engine 226 and the FIG. 7 process returns to step 722. However, if no connection currently exists to management engine 226, then management agent 344 attempts 740 a normal connection using normal connection program 606.

Management agent 344 then determines 740 whether the connection attempt to management engine 226 was successful. If the connection attempt was successful, then management agent 344 notifies 736 management engine 226 and the FIG. 7 process returns to step 722. However, if the connection attempt was unsuccessful, then management agent 344 checks 742 the corresponding alarm attributes 594 to determine the priority status of the alarm 590 which corresponds to the defined event.

If the status of the corresponding alarm 590 is low priority, then management agent 344 determines 743 whether the retries for a normal connection have been exhausted. The present invention compares a retry limit (a predefined number of permitted retries) and the current retry value (number of actual connection attempts for a particular event). Management agent 344 will not make additional normal connection attempts if the retry value equals the retry limit (the retries have been exhausted). If the normal retries have been exhausted, then the FIG. 7 process returns to step 722. However, if the retries have not been exhausted, then management agent 344 returns to step 738 and attempts another normal connection.

If the alarm priority is high in step 742, then management agent 344 attempts 744 a priority connection to management engine 226 via priority management program 608. Management agent 344 then determines 746 whether the priority connection attempt was successful. If the priority connection attempt was successful, then management agent 344 notifies 748 management engine 226 and the FIG. 7 process returns to step 722. However, if the priority connection attempt was not successful, then management agent 344 logs 750 the attempt failure and determines 752 whether the retries for a priority connection have been exhausted using a method similar to that described above in conjunction with step 743. If the priority retries have been exhausted, then the FIG. 7 process returns to step 722. However, if the retries have not been exhausted, then management agent 344 returns to step 744 to again attempt the priority connection via priority connection program 608.

It will be appreciated that the above-described management system overcomes major drawbacks associated with prior management systems by relieving the system administrator of a great deal of administrative effort in diverse computing environments. Such environments can give rise to large numbers of alarms 590 during a given time period. Management interface 124 and the system administrator are not required to address and respond to all of the alarms 590 that are generated by the managed computers 330. Responses are required only for alarms 590 that are specifically defined to call for a response. Also, alarms 590 that require a response are fed to the management interface 124 in an orderly and regular fashion, and only those alarms 590 are received that actually required by the systems administrator. The management system of the present invention thus functions according to the principle of "management by exception".

The foregoing description of the preferred embodiment for the present invention has been presented for purposes of illustration and description and is not intended to be exhaustive or to limit the invention to the precise forms disclosed. Modifications and variations of the invention are possible in light of the above teaching. It is intended that the spirit and scope of the invention are to be defined by reference to the following claims, along with the full scope of their equivalents.

What is claimed is:

1. A system for managing a computer network, comprising:

an administrative computer containing an interface for managing said computer network;

a server computer containing an engine for communicating with said interface; and a managed computer containing an agent for incorporating definitions of specified events and actionable information, and, when selected ones of said specified events occur, said agent, based on said information, enabling automatic corrective actions regardless of whether said interface or said engine is inoperable or inaccessible.

2. The system of claim 1 further comprising a connection aging module whereby said agent terminates said normal connection whenever said agent has not communicated to said engine via said normal connection for a predetermined time period.

3. The system of claim 1 wherein said agent accesses an alternate priority connection whenever said standard connection cannot be accessed and a high-priority event has occurred.

4. The system of claim 1 wherein said agent includes corrective scripts which said agent responsively and selectively executes when said specified events occur.

5. The system of claim 1 wherein said agent includes alarms which correspond to said specified events, said alarms including attributes which may be defined by a system administrator.

6. A method for managing a computer network, comprising the steps of:

defining specified events and actionable information within a managed computer;

detecting said specified events using an agent within said managed computer;

establishing a standard connection between said agent and an engine within a server computer; and enabling automatic corrective actions based on said information regardless of whether said engine or an interface communicating with said engine within an administrative computer is inoperable or inaccessible;

whereby said administrative computer may responsively manage said computer network.

7. The method of claim 6 further comprising the step of terminating said standard connection whenever said agent has not communicated to said interface via said standard connection for a predetermined time period.

8. The method of claim 6 further comprising the step of accessing an alternate priority connection whenever said standard connection cannot be established and a high-priority event has occurred.

9. The method of claim 6 wherein said agent includes corrective scripts which said agent responsively and selectively executes when said specified events occur.

10. The method of claim 6 wherein said agent includes alarms which correspond to said specified events, said alarms including attributes which may be defined by a system administrator.

11. A computer-readable medium comprising program instructions for causing an administrative computer to manage a computer network by performing the steps of:

defining specified events and actionable information within a managed computer;

detecting said specified events using an agent within said managed computer;

establishing a standard connection between said agent and an engine within a server computer; and enabling automatic corrective actions based on said information regardless of whether said engine or an interface communicating with said engine within said administrative computer is inoperable or inaccessible;

whereby said administrative computer may responsively manage said computer network.

12. The computer-readable medium of claim 11 further comprising the step of terminating said standard connection whenever said agent has not communicated to said interface via said standard connection for a predetermined time period.

13. The computer-readable medium of claim 11 further comprising the step of accessing an alternate priority connection whenever said standard connection cannot be established and a high-priority event has occurred.

14. The computer-readable medium of claim 11 wherein said agent includes corrective scripts which said agent responsively and selectively executes when said specified events occur.

15. The computer-readable medium of claim 11 wherein said agent includes alarms which correspond to said specified events, said alarms including attributes which may be defined by a system administrator.

16. A system for managing a computer network, comprising:

means for defining specified events and actionable information within an agent in a managed computer;

means for detecting said specified events in said managed computer;

means for establishing a standard connection between said agent and an engine within a server computer; and means for enabling automatic corrective actions regardless of whether said engine or an interface communicating with said engine within an administrative computer is inoperable or inaccessible;

whereby said administrative computer may responsively manage said computer network.

17. The system of claim 16 further comprising a connection aging module whereby said agent terminates said standard connection whenever said agent has not communicated to said engine via said standard connection for a predetermined time period.

18. The system of claim 16 wherein said means for establishing creates an alternate priority connection whenever said standard connection cannot be established and a high-priority event has occurred.

19. The system of claim 16 wherein said agent includes corrective scripts which said agent responsively and selectively executes when said specified events occur.

20. The system of claim 16 wherein said agent includes alarms which correspond to said specified events, said alarms including attributes which may be defined by a system administrator.

\* \* \* \* \*